(12) United States Patent
Herce Gil De Muro

(10) Patent No.: US 12,497,952 B2
(45) Date of Patent: Dec. 16, 2025

(54) COUPLINGS AND AUXILIARY COMPONENTS FOR WIND TURBINES, AND ASSOCIATED METHODS

(71) Applicant: General Electric Renovables Espana, S.L., Barcelona (ES)

(72) Inventor: Gerardo Herce Gil De Muro, Barcelona (ES)

(73) Assignee: GE Vernova Infrastructure Technology LLC, Greenville, SC (US)

(*) Notice: Subject to any disclaimer, the term of this patent is extended or adjusted under 35 U.S.C. 154(b) by 133 days.

(21) Appl. No.: 18/436,085

(22) Filed: Feb. 8, 2024

(65) Prior Publication Data
US 2024/0271604 A1    Aug. 15, 2024

(30) Foreign Application Priority Data
Feb. 9, 2023 (EP) ..................... 23382116

(51) Int. Cl.
*F03D 80/80* (2016.01)
*F16M 13/02* (2006.01)

(52) U.S. Cl.
CPC .............. *F03D 80/80* (2016.05); *F16M 13/02* (2013.01)

(58) Field of Classification Search
CPC .......... F03D 80/80; F03D 13/10; F03D 13/20; F16M 13/02; Y02E 10/72
USPC ...................................................... 248/218.4
See application file for complete search history.

(56) References Cited

U.S. PATENT DOCUMENTS

| | | | |
|---|---|---|---|
| 10,260,483 B2* | 4/2019 | Teichert | ............... F03D 7/0264 |
| 11,519,391 B2 | 12/2022 | Schade | |
| 11,992,968 B2* | 5/2024 | Fang | ................... E04G 21/0463 |
| 12,331,713 B2* | 6/2025 | Hoffmann | ............... E04H 12/08 |
| 2010/0124497 A1 | 5/2010 | Edenfeld | |
| 2015/0037166 A1* | 2/2015 | Venkatakrishnappa | ...................... F03D 80/88 52/651.01 |
| 2017/0248127 A1* | 8/2017 | Drobietz | ................. F03D 13/20 |

(Continued)

FOREIGN PATENT DOCUMENTS

| | | |
|---|---|---|
| DE | 102019000055 A1 | 7/2020 |
| EP | 2187049 A2 | 5/2010 |

OTHER PUBLICATIONS

European Search Report Corresponding to EP23382116 on Aug. 14, 2023.

*Primary Examiner* — Todd M Epps
(74) *Attorney, Agent, or Firm* — Dority & Manning, P.A.

(57) ABSTRACT

The present disclosure is related to couplings for mechanically connecting an auxiliary component to a wind turbine tower. The couplings comprise a mounting bracket configured to be mounted on a shaft of the auxiliary component, and a tower interface configured to be arranged at an outside of the wind turbine tower and comprising a first fastener hole. The couplings further comprise a pad configured to be arranged at an inside of the wind turbine tower, and comprising a second fastener hole, wherein the first and the second fastener holes are configured to receive a fastener extending through a hole in the wind turbine tower to attach the auxiliary component to the wind turbine tower, and wherein the mounting bracket is configured to swivel about the shaft of the auxiliary component and is displaceable along a longitudinal axis of the shaft. The present disclosure further relates to methods for removing auxiliary components from a wind turbine.

15 Claims, 6 Drawing Sheets

(56) References Cited

U.S. PATENT DOCUMENTS

2019/0235158 A1    8/2019   Dee et al.
2019/0301196 A1*  10/2019  Reed ..................... F03D 13/20

* cited by examiner

COUPLINGS AND AUXILIARY COMPONENTS FOR WIND TURBINES, AND ASSOCIATED METHODS

FIELD

The present disclosure relates to couplings for mechanically connecting an auxiliary component to a wind turbine tower and to auxiliary components comprising such couplings. Further, the present disclosure relates to methods for installing and/or removing auxiliary components from a wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. This rotation generates a torque that is normally transmitted through a rotor shaft to a generator, either directly ("directly driven" or "gearless") or through the use of a gearbox. This way, the generator produces electricity which can be supplied to the electrical grid.

Wind turbines have evolved rapidly over the last decades with a clear trend of increasing size. The power generated by a wind turbine is proportional to the rotor swept area and, therefore to the square of the blade length. Thus, higher towers and longer blades have been used with the goal of extracting more energy from the wind, leading to more electrical power production. The increase in size over the years has led to a substantial increase in the loads acting on wind turbine components, and has posed new challenges for a wide range of disciplines including mechanical, electrical, materials and civil engineering among others.

Wind turbine towers are generally designed to sustain heavy and continued loads during the entire lifespan of the wind turbine. Wind turbine towers transfer static and dynamic loads acting on the wind turbine rotor and nacelle to the wind turbine foundation.

Wind turbine towers typically comprise multiple tower sections which may be cylindrical or may have a tapered shape with a larger diameter near the bottom and a smaller diameter near the top of the section. Imperfections and defects during manufacturing tower components may lead to lower than expected mechanical properties, or local concentration of stresses among other, resulting in a premature failure of the tower. Similarly, mechanical or chemical processes carried out on the wind turbine tower after it has been manufactured may reduce the performance and life expectancy of the tower.

Therefore, the likelihood of structural failure, e.g. due to fatigue or concentration of stresses, in wind turbine components, such as a tower structure is at least partially dependent on post-manufacturing processes such as welding of additional components, perforations and other machining processes. To mitigate the premature structural failure of wind turbine towers and other components, it is of interest to provide connectors for providing mechanical coupling between a wind turbine and an auxiliary component that mitigate the premature structural failure of wind turbine components.

The present disclosure provides methods and devices to at least partially overcome some of the aforementioned drawbacks.

SUMMARY

In an aspect of the present disclosure, a coupling for mechanically connecting an auxiliary component to a wind turbine tower is provided. The coupling comprises a mounting bracket configured to be mounted on a shaft of the auxiliary component, and comprising a tower interface configured to be arranged at an outside of the wind turbine tower and comprising a first fastener hole. The coupling further comprises a pad configured to be arranged at an inside of the wind turbine tower, and comprising a second fastener hole. The first fastener hole and the second fastener hole are configured to receive a fastener extending through a hole in the wind turbine tower to attach the auxiliary component to the wind turbine tower. The mounting bracket is configured to swivel about the shaft of the auxiliary component and is displaceable along a longitudinal axis of the shaft.

According to this aspect, the coupling serves as a mechanical interface between a wind turbine tower and an auxiliary component, reducing the complexity of the coupling process between the wind turbine tower and the auxiliary component. Further, providing a coupling with a mounting bracket which swivels about the shaft of the auxiliary component and allows the coupling to accommodate to wind turbine components with different geometries, i.e. sections of a wind turbine tower with different curvature. Further, it also reduces the likelihood of premature structural failure of the wind turbine component compared with more invasive approaches, e.g. welding, excessive perforation or machining. Further, the coupling does not result in a permanent modification of the wind turbine tower. In fact, the coupling may be removed from the wind turbine tower when the auxiliary component is dismounted. This simplifies other tasks such as maintenance once the auxiliary component is not in place. The mounting bracket being displaceable along a longitudinal axis of the shaft facilitates installation and removing the auxiliary component as will be explained herein.

In an additional aspect, an auxiliary component configured to be connected to a wind turbine tower is provided. The auxiliary component comprises one or more couplings for mechanically connecting the auxiliary component to the wind turbine tower. Further, the coupling comprises a mounting bracket configured to be mounted on a shaft of the auxiliary component, and comprising a tower interface configured to be arranged at an outside of the wind turbine tower and comprising a first fastener hole. The coupling further comprises a pad configured to be arranged at an inside of the wind turbine tower, and comprising a second fastener hole. The first fastener hole and the second fastener hole are configured to receive a fastener extending through a hole in the wind turbine tower to attach the auxiliary component to the wind turbine tower. The mounting bracket is configured to swivel about the shaft of the auxiliary component and is displaceable along a longitudinal axis of the shaft.

In yet an additional aspect, a method for removing an auxiliary component attached with one or more fasteners at one or more attachment points of a wind turbine is disclosed. The method comprises using hoisting equipment to lift the auxiliary component. The method also comprises detecting a vertical displacement of the auxiliary component with respect to the attachment points of the tower. Further, the method comprises removing the fasteners after detecting the vertical displacement, and further lifting the auxiliary component using the hoisting equipment to remove the auxiliary component from the wind turbine tower.

This additional aspect provides a method for removing an auxiliary component in a controlled and optimized manner compared with other approaches known in the art. Detecting a vertical displacement of the auxiliary component with respect to the attachment points of the tower indicates in a clear and reliable manner that the coupling is in an unloaded state, that is, that the load of the auxiliary component is held by the hoisting equipment. Thus, the fasteners attaching the auxiliary component to the wind turbine tower may be removed and the coupling may be safely unfastened by e.g., qualified personnel. This method considerably reduces the risk of removing the fastener which attaches the auxiliary component to the wind turbine tower when the coupling is still subjected to weight loads, and also prevents additional stresses on the coupling during detaching the auxiliary component, e.g. an excessive lift force to unload the coupling.

Thus, these couplings and associated methods facilitate the installation of auxiliary components on wind turbines, whereas at the same time enhance the lifespan of the wind turbine, and secondary tasks such as maintenance may be simplified.

Additional objects, advantages and features of embodiments of the present disclosure will become apparent to those skilled in the art upon examination of the description, or may be learned by practice.

DETAILED DESCRIPTION OF EXAMPLES

Figure 1:
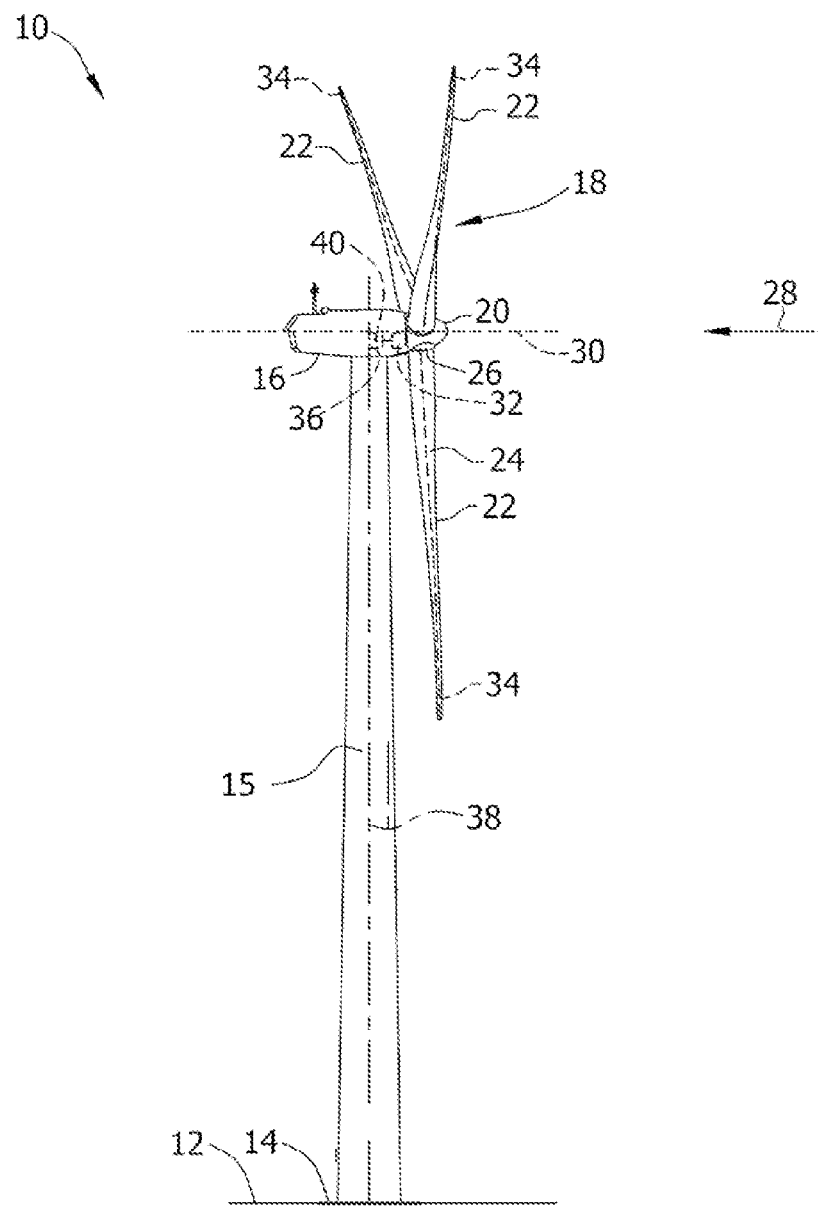
FIG. 1 schematically illustrates a perspective view of one example of a wind turbine.

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
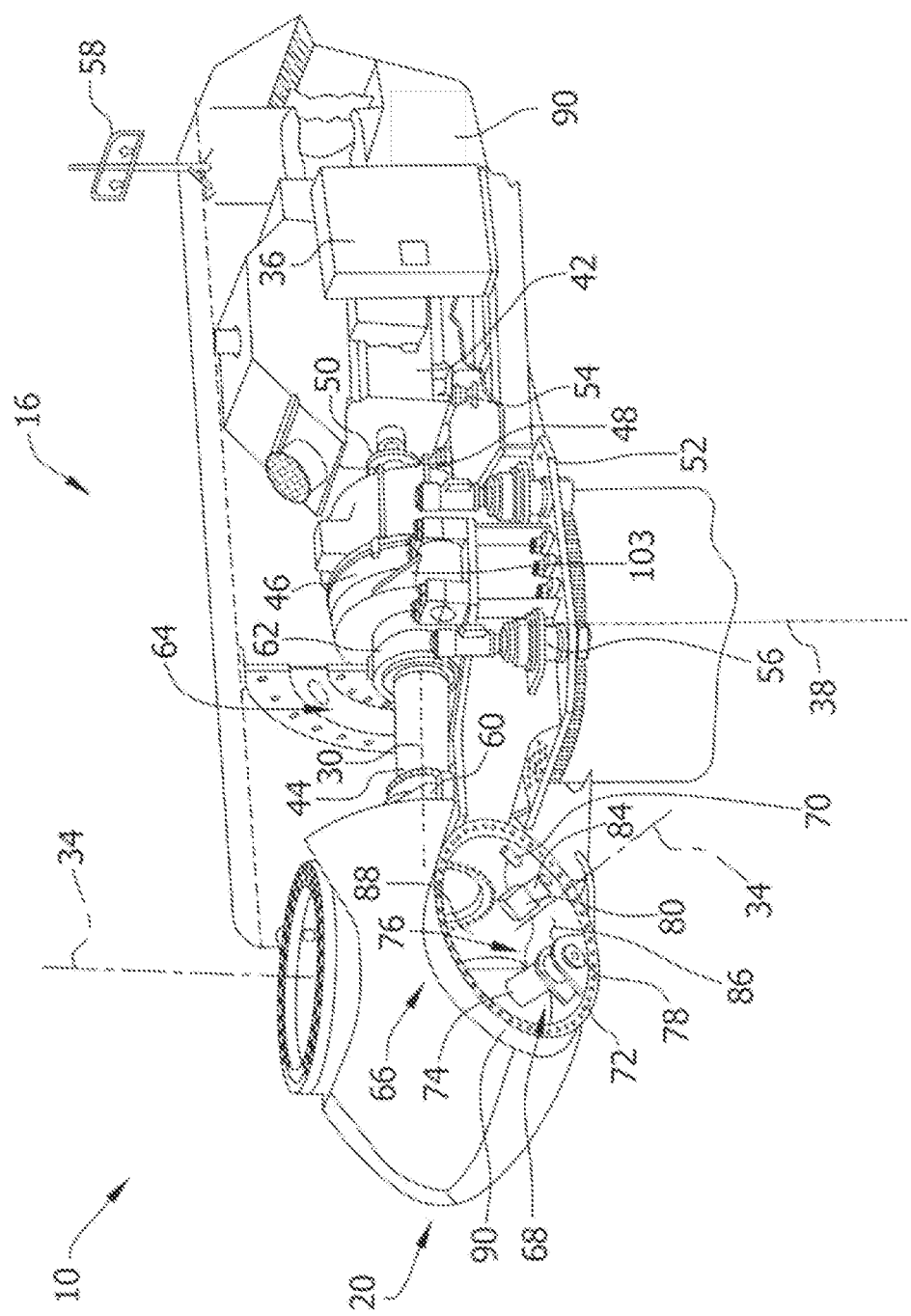
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage e.g., 10-35 KV. Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer roof surface of hub 20 and may be coupled, directly or indirectly, to the outer roof surface.

Figure 3:
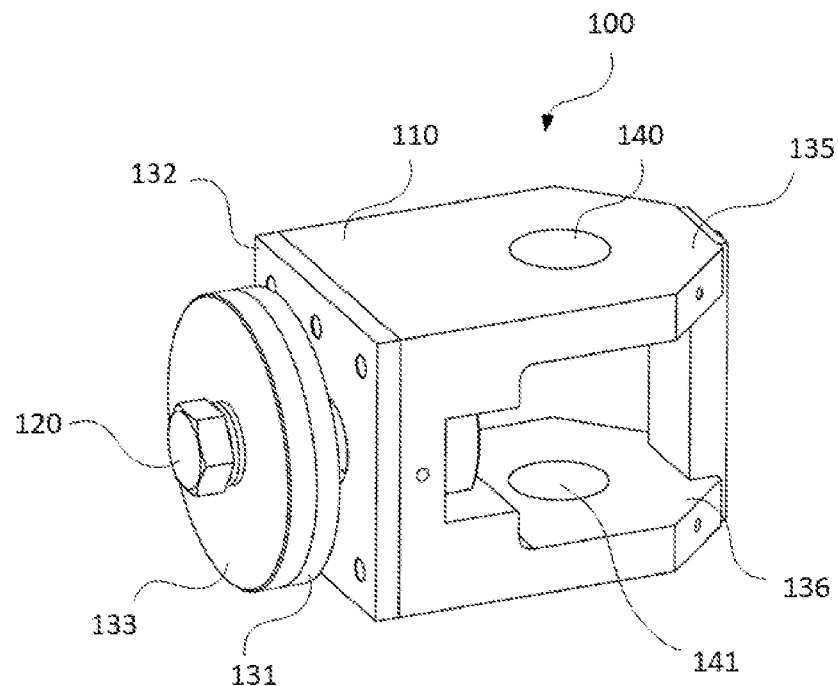
FIG. 3 schematically illustrates a perspective view of an example of a coupling according to the present disclosure.

FIG. 3 schematically illustrates a perspective view of an example of a coupling 100 according to an example of the present disclosure. In particular, FIG. 3 shows a coupling 100 for mechanically connecting an auxiliary component (illustrated with numerical reference 200 in FIG. 5) to a wind turbine tower 15. The coupling 100 comprises a mounting bracket 110 configured to be mounted on a shaft 250 of the auxiliary component 200, and comprises a tower interface configured to be arranged at an outside of the wind turbine tower and comprising a first fastener hole 160. In some examples, the first fastener hole 160 may be a slotted hole.

As shown in FIG. 3, the coupling 100 comprises a pad 133 configured to be arranged at an inside of the wind turbine tower, and comprising a second fastener hole 161. The first fastener hole 160 and the second fastener hole 161 are configured to receive a fastener 120 extending through a hole in the wind turbine tower to attach the auxiliary component to the wind turbine tower. Additionally, the mounting bracket 110 is configured to swivel about the shaft 250 of the auxiliary component 200 and is displaceable along a longitudinal axis of the shaft.

In some examples, the mounting bracket 110 may comprise a first flange 135 with a first hole 140 and a second flange 136 with a second hole 141. The first hole 140 and the second hole 141 may be aligned and may be configured to be mounted around the shaft 250 of the auxiliary component.

In the illustrated example in FIG. 3, the flange comprises a through hole, but in other examples, the first and second holes 140, 141 may be slots, e.g. slots with a substantially circular cross-section to promote swivelling of the mounting bracket 110 about the shaft 250 of the auxiliary component 200. This swivelling allows the coupling 100 to accommodate to components of the wind turbine 10 with different geometries. For example, the same coupling 100 may be used at different locations of a wind turbine tower 15 with varying cross-section.

Also shown in FIG. 3, the first flange 135 and the second flange 136 of the mounting bracket 110 may be parallel to each other and may have an identical polygon shape. In other examples, the flanges may not be parallel to each other or may have any other suitable shape, e.g. curved shape, etc.

Further, the mounting bracket 110 may be made of any material capable of withstanding and transferring the loads acting on the auxiliary component 200 to the wind turbine 10. In some examples, the mounting bracket 110 may be made of steel, and more specifically of stainless steel. In other examples, the mounting bracket 110 may be made of other suitable alloys, such as an aluminium based alloy or a titanium based alloy, among others.

Figure 4:
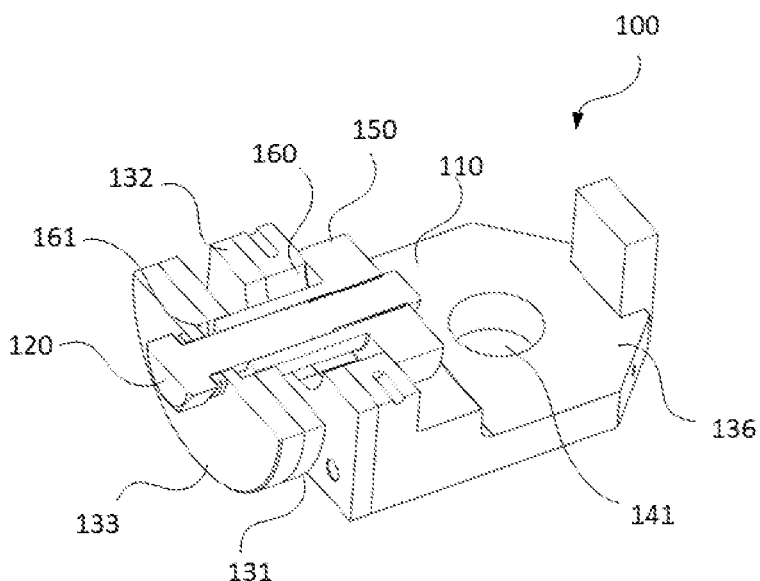
FIG. 4 schematically illustrates a perspective view of the coupling of FIG. 3 cut through plane A-A.

FIG. 4 schematically illustrates a perspective view of the coupling 100 of FIG. 3 cut through plane A-A. As shown in FIGS. 3 and 4, the coupling 100 in this example is substantially symmetric with respect to plane A-A. In other examples, the coupling 100 may have more, or less, symmetry planes.

FIG. 4 shows that the coupling 100 may also comprise a bushing 150 where the fastener 120 may be inserted. The bushing 150 may be fixedly attached to the coupling 100 or may be joined to the coupling in a detachable manner, e.g. by a thread. The bushing 150 may extend through the first fastener hole 160 of the mounting bracket and a hole in a wind turbine component. Thus, the fastener 120 may pass through a wind turbine component, e.g. a tower shell, coupling with the bushing 150 and securing the mechanical connection between the coupling 100 and the wind turbine tower 15.

In addition, the width of the bushing 150 may be smaller than the width of the first fastener hole 160 of the mounting bracket 110. This may allow the bushing to be positioned in different transverse positions along the first fastener hole, facilitating its mounting to the wind turbine tower with different curvature and size of different tower sections.

In examples, the holes in the wind turbine tower may be drilled (or otherwise manufactured) prior to introducing the fasteners 120. The holes may be threaded holes, wherein the thread can mate with suitable bolts.

In addition, in this example the mounting bracket 110 may be configured to receive the fastener 120 at different locations. More particularly, the mounting bracket 110 comprises a slotted hole 160 along which the fastener 120 may be positioned and secured. This allows a certain degree of freedom during the installation of the auxiliary component in which the coupling 100 is mounted which may enable joining the mounting bracket and the pad with the fastener to differently shaped and sized tower sections.

Also shown in this example, the coupling 100 may comprise one or more compressible layers 131, 132 configured to contact and adapt to a geometry of the wind turbine. For example, the pad 133 may comprise a first compressible layer 131 configured to contact the inside of the wind turbine tower 15. In addition, the tower interface of the mounting bracket 110 may comprise a second compressible layer 132 configured to contact the outside of the wind turbine tower. A first compressible layer 131 may be configured to contact and adapt to an inner geometry of the wind turbine tower and a second compressible layer 132 may be configured to contact and adapt to an outer geometry of the wind turbine tower. In further examples, these compressible layers 131, 132 may be particularly configured to adapt to an inner and outer side of a wind turbine tower 15 shell. Further, the compressible layers 131, 132 may comprise polyurethane or other suitable material that may adapt its geometry according to the force acting on them. Thus, the coupling 100 may contact a wind turbine tower through substantially flexible and deformable compressible layers 131, 132, which may provide substantially homogenous pressure distribution at the attachment points. Further, the compressible layers 131, 132 may result in a layer of non-uniform thickness that may compensate geometry features that may not be achievable by the swivelling of the coupling 100 about the shaft 250 of the auxiliary component alone.

Figure 5:
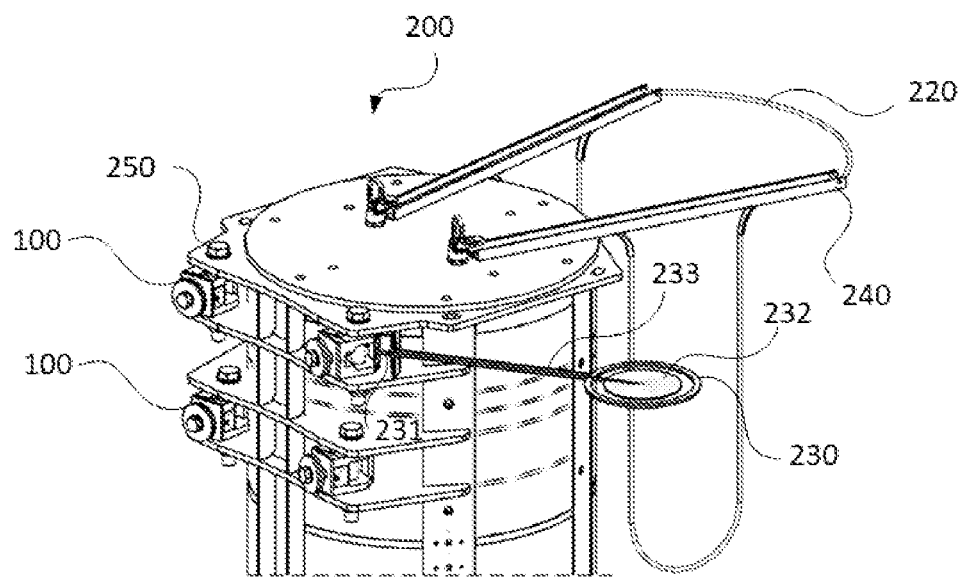
FIG. 5 schematically illustrates an example of an auxiliary component according to the present disclosure.

FIG. 5 schematically illustrates an example of an auxiliary component 200 according to the present disclosure. The auxiliary component 200 is configured to be connected to a wind turbine tower. In this particular example, the auxiliary component is a tuned mass damper. A tuned mass damper (TMD), also known as a harmonic absorber or is a device mounted in structures to reduce mechanical vibrations. A TMD usually consists of a mass mounted to one or more resilient supports e.g. springs. Its oscillation frequency may be tuned to be similar to the resonant frequency of the object or structure that it is mounted. Oscillations of the structure (in this case the wind turbine or the wind turbine tower) may be reduced using a TMD. By reducing oscillations, the risk of structural damage or failure may be reduced.

The tuned mass damper 200 may comprise one or more shafts 250 where the mounting brackets 110 of the couplings 100 may be mounted. In some examples, the tuned mass damper may comprise two shafts 250 arranged at a first vertical position along the tunned mass damper 200 and other two shafts 250 arranged at a second vertical position along the tunned mass damper 200. Further, the tuned mass damper 200 comprises one or more couplings 100 for connecting the tunned mass damper 200 to the wind turbine tower 15. The couplings 100 may include any of the features previously disclosed in FIGS. 3 and 4.

As shown in FIG. 5, the tuned mass damper 200 may comprise a plurality of couplings 100. Each of the couplings is mounted around a shaft 250 of the tunned mass damper 200, such that the mounting brackets 110 of the couplings 100 may swivel about themIn some examples, the two couplings at the first vertical position may be arranged with a greater distance between them than the two couplings at the second vertical position. This distribution of the couplings 100 may sufficiently share the weight of the tuned mass damper 200 between various couplings and may ease the installation process in the wind turbine, i.e. a distribution of coupling points may be chosen such that the tuned mass damper 200 may be installed in a single configuration only so as to avoid installation errors.

Figure 8A:
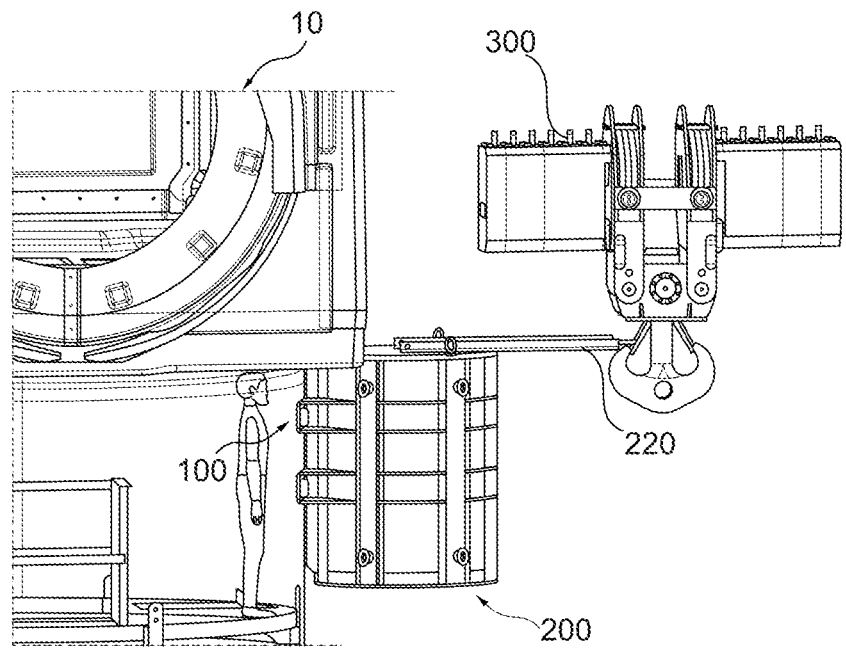
FIGS. 8A-8C show different steps of a method for removing an auxiliary component from a wind turbine tower according to the present disclosure.
Figure 8B:
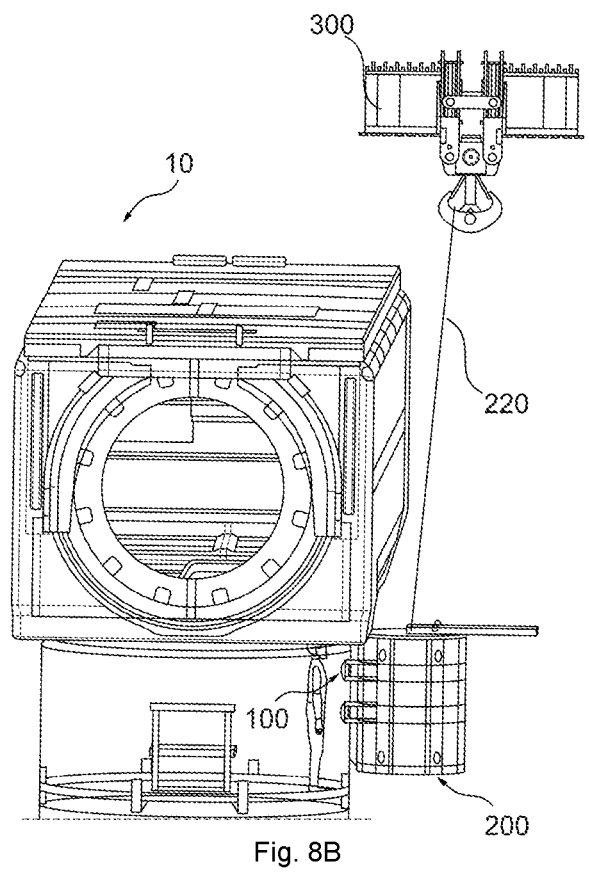
Figure 8C:
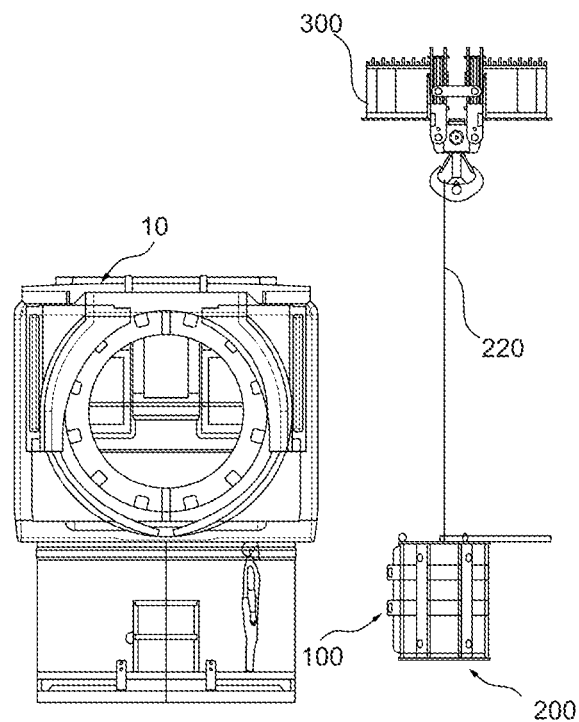

Also shown in FIG. 5, the tuned mass damper 200 may comprise a cable 220 configured to be lifted by hoisting equipment (illustrated with numerical reference 300 in FIGS. 8A-8C). The cable 220 may form a loop and may further comprise one or more guiding bars 240 for guiding portions of the loop. In the illustrated example, the cable 220 forms a loop and guiding bars 240 effectively move the cable 220 away from the central axis of the tuned mass damper 200. This allows the hoisting equipment to hoist the tuned mass damper 200 without interfering with other components of the wind turbine and to generate a lift force at an angle relative to the longitudinal axis of a wind turbine tower that may promote a fast distancing of the tuned mass damper 200 from the wind turbine during a removing step.

The example of the tuned mass damper 200 in FIG. 5 also comprises a sensor system configured to detect a longitudinal position of the mounting bracket 110 of one of the couplings 100 with respect to the shaft 250 around which the mounting bracket is arranged. The sensor system may comprise a detectable element 233 and a proximity sensor 230 for detecting proximity of the detectable element 233.

The detectable element 233 may be attached to the mounting bracket 110 of the coupling 100. The proximity sensor may be attached to the tuned mass damper 200. In some examples, the detectable element 233 may comprise a first end 231 attached to the mounting bracket 110 and a detectable portion 232 at a second end. For example, the proximity sensor 230 may detect a vertical displacement of the tuned mass damper with respect to the attachment point of the wind turbine tower 15, i.e. where the fastener 120 is firmly secured. Thus, in some examples the proximity sensor 230 may detect when a portion of the tuned mass damper 200 moves along the first hole 140 of a first flange 135 and the second hole 141 of a second flange 136 of the mounting bracket 110. This will be discussed in more detail in relation with FIGS. 8A-8C.

Figure 6:
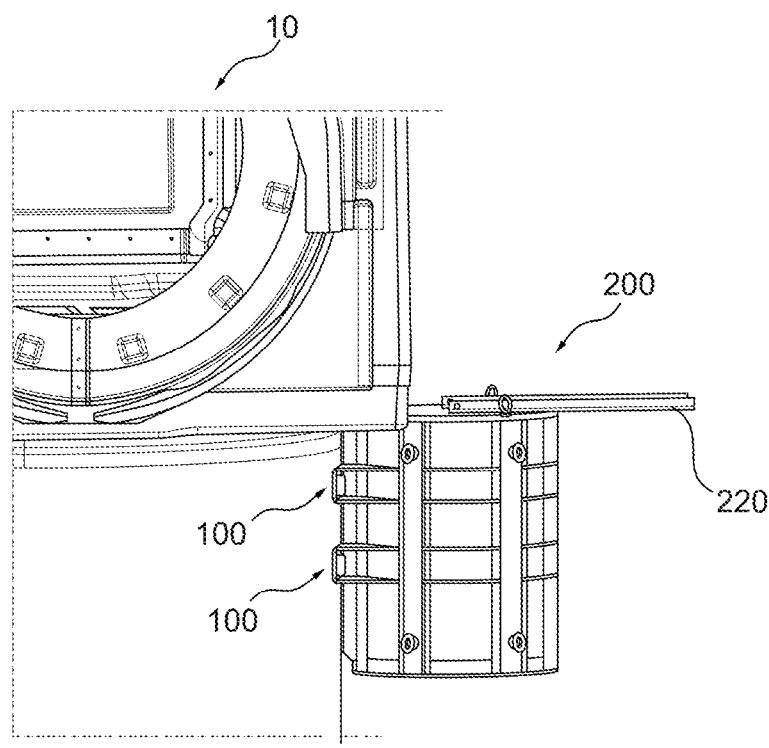
FIG. 6 shows a wind turbine tower comprising an auxiliary component according to the present disclosure.

FIG. 6 discloses a wind turbine tower 15 comprising a tuned mass damper 200 as the one previously disclosed in FIG. 5. This figure shows an example of a tuned mass damper 200 installed on the outer side of a tower shell of the wind turbine 10.

In some examples, the tuned mass damper may be installed to a wind turbine tower section before the tower section is joined to another tower section to erect the wind turbine tower. Further, the wind turbine tower section may comprise attachment points in its shell where the couplings may be installed without the need of performing any welding operation. In some examples, the attachment points may be holes. The attachment points may be substantially aligned with a radial direction of the tower shell for a better distribution of loads around the tower shell portion where the tuned mass damper 200 is to be installed.

A wind turbine tower comprising a tuned mass damper 200 as discussed, may be less affected by vortex induced vibrations during tower erection. The wind turbine may be an onshore wind turbine or an offshore wind turbine. It has been found that vortex induced vibrations may occur during the installation process of a wind turbine, and particularly also before the rotor or rotor blades have been installed.

In examples, one or more TMD's may be mounted on the wind turbine tower 15 during installation and they may be removed prior to installation of the blades, to avoid the risk of blades colliding with the TMD('s).

In other examples, the wind turbine 10 may comprise any other auxiliary component with a coupling 100 according to the present disclosure. Such an auxiliary component may be a component used during installation, illumination fixtures, beacons, tools or other.

Figure 7:
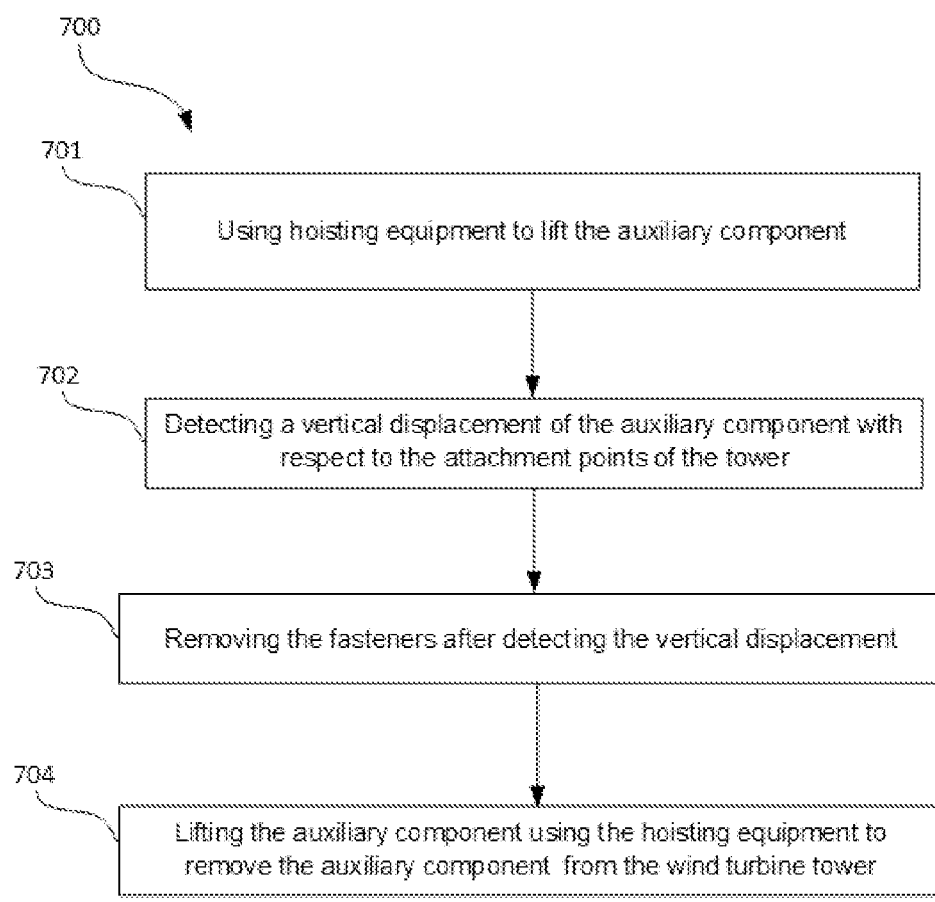
FIG. 7 shows a flowchart of an example of a method for removing an auxiliary component from a wind turbine tower according to the present disclosure.

In another aspect of the disclosure, a method 700 is disclosed. The method 700 is suitable for removing an auxiliary component attached with one or more fasteners at one or more attachment points of a wind turbine tower. The method 700 is schematically illustrated in FIG. 7.

The method 700 comprises, at block 701, using hoisting equipment to lift the auxiliary component. Further, the method comprises, at block 702, detecting a vertical displacement of the auxiliary component with respect to the attachment points of the tower, at block 703, removing the fasteners after detecting the vertical displacement, and at block 704, lifting the auxiliary component using the hoisting equipment to remove the auxiliary component from the wind turbine tower.

Thus, the method 700 allows removing an auxiliary component 200 from a wind turbine tower 15 in a safe manner by ensuring that the coupling 100 is not supporting the weights load of the auxiliary component 200 before the fasteners 120 are removed, and without generating additional loads on the connection between the auxiliary component 200 and the wind turbine 10, e.g. by applying a lifting force on an auxiliary component fixedly connected to the wind turbine 10. Further, the position of the auxiliary component may be easily tracked e.g., by qualified personnel on site or remotely.

In examples, the auxiliary component 200 may comprise a cable loop. Hoisting equipment 300 may be connected to the cable loop of the auxiliary component for lifting the auxiliary component. In some examples, the hoisting equipment may be a crane.

The auxiliary component may be attached at the attachment points of the wind turbine tower with a mounting bracket 110 which is vertically displaceable along a shaft of the auxiliary component. In some examples, detecting the vertical displacement of the auxiliary component 200 with respect to the attachment points of the tower may comprise detecting a vertical displacement of at least one of the mounting brackets 110 along the shaft 250 of the auxiliary component. Further, in examples, the vertical displacement of the auxiliary component 200 may be detected by a sensor system, configured to detect a longitudinal position of the mounting bracket 110 of one or more of the couplings 100 with respect to the shaft 250 of the auxiliary component around which the mounting bracket 110 is arranged. Thus, as soon as the hoisting equipment 300 moves the auxiliary component 200 relative to the coupling 100 and unloads the couplings 100, the sensor system may report this information to a controller or to the personnel in charge of removing the auxiliary component 200.

Additional steps that may be carried out in examples of the previous method are illustrated in FIGS. 8A-8C. In this example again, a Tuned Mass Damper has been selected as the auxiliary component, but it should be clear that similar methods may be carried out with other auxiliary components.

More precisely, FIG. 8A shows that the method may comprise using hoisting equipment 300 to lift the tuned mass damper 200 so that a vertical displacement of the tuned mass damper with respect to the attachment points of the tower is achieved. The vertical displacement may be indicative of the couplings 100 not being subjected to weight loads from the tuned mass damper 200.

As illustrated in FIG. 8A, the hoisting equipment 300, e.g., a crane, may connect to the cable loop of the tuned mass damper at a location that is at a significant distance from a central axis of the tuned mass damper 200. This prevents the hoisting equipment 300 to interfere with other components of the wind turbine such as a nacelle.

FIG. 8B illustrates the tuned mass damper 200 in a (partially) lifted position, i.e., the couplings 100 mechanically connecting the tuned mass damper 200 to the wind turbine tower are unloaded. But the TMD is stall attached at the tower. The unloading may be detected by a sensor system (shown in FIG. 5), comprising a proximity sensor and a detectable element attached to the mounting bracket, which may detect the lifted position of the tunned mass damper and may send a signal reporting this condition. Further, in other examples, the sensor system may also send a command signal to the lifting equipment 300 to stop the lifting step. Any suitable signal may be used, e.g. audible and/or visible indications at the auxiliary component or at a remote system may indicate to personnel that the unloaded condition has been reached.

Once the couplings 100 are not subjected to weight loads from the tuned mass damper 200, the personnel may remove the fasteners 120 and release the couplings 100 from the wind turbine tower.

FIG. 8C illustrates that once the couplings 100 have been unfastened from the wind turbine tower, the tuned mass damper 200 may be separated from the wind turbine tower. Following this method, a tuned mass damper 200 may be installed in the wind turbine tower during tower erection (when vortex induced vibrations may compromise the structure of the wind turbine) and it may be detached from the tower once it is no longer needed. The method disclosed does not involve a significant permanent modification of the wind turbine tower since the auxiliary component 200 may be easily installed through wind turbine tower through holes that may be filled later, e.g., with composite material.

It is noted that all features of the connector 100 can be included in the auxiliary component 200 and in method 700 in the present disclosure, and vice versa.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A coupling for mechanically connecting an auxiliary component to a wind turbine tower, the coupling comprising:
   a mounting bracket configured to be mounted on a shaft of the auxiliary component, the mounting bracket comprising a tower interface configured to be arranged at an outside of the wind turbine tower, the tower interface comprising a first fastener hole;
   a pad configured to be arranged at an inside of the wind turbine tower, the pad comprising a second fastener hole;
   the first fastener hole and the second fastener hole configured to receive a fastener that extends through a hole in the wind turbine tower to attach the auxiliary component to the wind turbine tower; and
   the mounting bracket configured to swivel about the shaft of the auxiliary component and displaceable along a longitudinal axis of the shaft.

2. The coupling of claim 1, wherein the mounting bracket comprises a first flange with a first hole extending therethrough, and a second flange with a second hole extending therethrough, the first flange spaced from the second flange and the first hole aligned with the second hole, wherein the shaft of the auxiliary component extends through the first and second holes.

3. The coupling of claim 1, wherein the pad comprises a first compressible layer configured to contact the inside of the wind turbine tower.

4. The coupling of claim 3, wherein the tower interface comprises a second compressible layer configured to contact the outside of the wind turbine tower.

5. An auxiliary component configured to be connected to a wind turbine tower, the auxiliary component comprising the coupling according to claim 1.

6. The auxiliary component of claim 5, wherein the auxiliary component comprises a tuned mass damper.

7. The auxiliary component of claim 5, comprising a plurality of the couplings, wherein two of the couplings are arranged at a first vertical position along the auxiliary component, and wherein another two of the couplings are arranged at a second vertical position along the auxiliary component.

8. The auxiliary component of claim 7, wherein the two couplings at the first vertical position are arranged with a greater horizontal distance therebetween than the two couplings at the second vertical position.

9. The auxiliary component of claim 5, further comprising a cable configured to be connected to hoisting equipment for lifting the auxiliary component to a position on the wind turbine tower.

10. The auxiliary component of claim 5, further comprising a sensor system configured to detect a longitudinal position of the mounting bracket of the coupling relative to the shaft on which the mounting bracket is arranged.

11. The auxiliary component of claim 10, wherein the sensor system comprises a detectable element and a proximity sensor that detects the detectable element, wherein the detectable element is attached to the mounting bracket.

12. The auxiliary component of claim 11, wherein the detectable element comprises a first end attached to the mounting bracket and a detectable portion at a second end of the detectable element.

13. A method for removing an auxiliary component that is mounted at an attachment point on a wind turbine tower with the coupling according to claim 1 via a fastener extending through the first and second fastener holes, the method comprising:

attaching a cable to the auxiliary component and using hoisting equipment configured with the cable to lift the auxiliary component;

detecting a vertical displacement of the auxiliary component with respect to the attachment point of the tower;

removing the fastener after detecting the vertical displacement; and further lifting the auxiliary component using the hoisting equipment to remove the auxiliary component from the wind turbine tower.

14. The method of claim 13, wherein the auxiliary component is attached at the attachment points with the mounting bracket that is vertically displaceable along the shaft of the auxiliary component.

15. The method of claim 14, wherein detecting the vertical displacement of the auxiliary component comprises detecting vertical displacement of the mounting brackets along the shaft of the auxiliary component.

* * * * *